United States Patent
Higuchi

(10) Patent No.: US 11,473,659 B2
(45) Date of Patent: Oct. 18, 2022

(54) TORQUE FLUCTUATION INHIBITING DEVICE AND POWER TRANSMISSION DEVICE

(71) Applicant: EXEDY Corporation, Neyagawa (JP)

(72) Inventor: Koichi Higuchi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 288 days.

(21) Appl. No.: 16/897,572

(22) Filed: Jun. 10, 2020

(65) Prior Publication Data

US 2021/0079990 A1    Mar. 18, 2021

(30) Foreign Application Priority Data

Sep. 13, 2019    (JP) .............................. JP2019-167273

(51) Int. Cl.
    *F16H 45/02*    (2006.01)
    *F16F 15/14*    (2006.01)

(52) U.S. Cl.
    CPC ........... *F16H 45/02* (2013.01); *F16F 15/145* (2013.01); *F16F 2230/0064* (2013.01); *F16H 2045/0221* (2013.01)

(58) Field of Classification Search
    None
    See application file for complete search history.

(56) References Cited

U.S. PATENT DOCUMENTS

2018/0187745 A1*  7/2018  Tomiyama ............ F16F 15/145
2018/0306270 A1* 10/2018  Tomiyama ............ F16F 15/145

FOREIGN PATENT DOCUMENTS

JP    2018-132161 A     8/2018
JP    2018132161 A  *  8/2018

* cited by examiner

*Primary Examiner* — Vicky A Johnson
(74) *Attorney, Agent, or Firm* — United IP Counselors, LLC

(57) ABSTRACT

A torque fluctuation inhibiting device includes first and second rotatable rotors, a centrifugal element and a cam mechanism. The first rotor includes an accommodation portion. The second rotor is rotatable with and relative to the first rotor. The centrifugal element is disposed in the accommodation portion to be radially movable, and receives a centrifugal force generated by rotation of the first or second rotor. The cam mechanism receives the centrifugal force acting on the centrifugal element, and converts the centrifugal force into a circumferential force directed to reduce rotational phase difference between the first and second rotors. The cam mechanism includes a cam surface provided on the centrifugal element, and a cam follower which contacts the cam surface. The cam follower transmits a force therethrough between the centrifugal element and the second rotor. The centrifugal element is radially moved while rolling on an inner wall surface of the accommodation portion.

9 Claims, 9 Drawing Sheets ly, each centrifugal element has been demanded to be configured as simply as possible. In view of the above, it is an object of the invention of the present application to make a centrifugal element radially movable in a smooth manner and configure the centrifugal element as simply as possible.

TORQUE FLUCTUATION INHIBITING DEVICE AND POWER TRANSMISSION DEVICE

CROSS-REFERENCE TO RELATED APPLICATION

This application claims priority to Japanese Patent Application No. 2019-167273, filed on Sep. 13, 2019. The contents of that application are incorporated by reference herein in their entirety.

TECHNICAL FIELD

The present invention relates to a torque fluctuation inhibiting device and a power transmission device.

BACKGROUND ART

Torque fluctuation inhibiting devices include an input member and an inertia member. For example, in a torque fluctuation inhibiting device described in Japan Laid-open Patent Application Publication No. 2018-132161, centrifugal elements are disposed in recessed portions of a hub flange, respectively, while being radially movable therein. Each centrifugal element is moved radially outward by a centrifugal force acting thereon in rotation of the hub flange. Besides, each centrifugal element is provided with rollers so as to be radially movable in a smooth manner.

In the torque fluctuation inhibiting device described above, each centrifugal element is provided with the rollers so as to be radially moved in the smooth manner. However, contrary to such structure, each centrifugal element has been demanded to be configured as simply as possible. In view of the above, it is an object of the invention of the present application to make a centrifugal element radially movable in a smooth manner and configure the centrifugal element as simply as possible.

BRIEF SUMMARY

A torque fluctuation inhibiting device according to a first aspect of the present invention includes a first rotor, a second rotor, a centrifugal element and a cam mechanism. The first rotor includes an accommodation portion. The first rotor is disposed to be rotatable. The second rotor is disposed to be rotatable with the first rotor and be rotatable relative to the first rotor. The centrifugal element is disposed in the accommodation portion so as to be radially movable. The centrifugal element receives a centrifugal force generated by rotation of the first or second rotor. The cam mechanism receives the centrifugal force acting on the centrifugal element and converts the centrifugal force into a circumferential force directed to reduce rotational phase difference between the first rotor and the second rotor. The cam mechanism includes a cam surface and a cam follower. The cam surface is provided on the centrifugal element. The cam follower makes contact with the cam surface and transmits a force therethrough between the centrifugal element and the second rotor. The centrifugal element is configured to be radially moved while rolling on an inner wall surface of the accommodation portion.

According to the configuration, the centrifugal element is radially moved while rolling on the inner wall surface of the accommodation portion. Hence, the centrifugal element can be radially moved in a smoother manner than that sliding on the inner wall surface of the accommodation portion.

Preferably, the cam follower rolls on the cam surface.

Preferably, the centrifugal element includes a first through hole axially penetrating therethrough. The cam surface is provided as part of an inner wall surface of the first through hole.

Preferably, the cam follower is attached to the second rotor while being rotatable about a rotational axis thereof.

Preferably, the second rotary member includes a second through hole. The cam follower rolls on an inner wall surface of the second through hole.

Preferably, the cam follower is a roller made in shape of a solid or hollow cylinder. It should be noted that the cam follower can be constant in diameter, or alternatively, can be shaped to include a large diameter portion and a small diameter portion.

A power transmission device according to a second aspect of the present invention includes an input member, an output member and the torque fluctuation inhibiting device configured as any of the above. The output member is a member to which a torque is transmitted from the input member.

Overall, according to the present invention, a centrifugal element can be radially moved in a smooth manner and can be configured as simply as possible.

DETAILED DESCRIPTION

Figure 1:
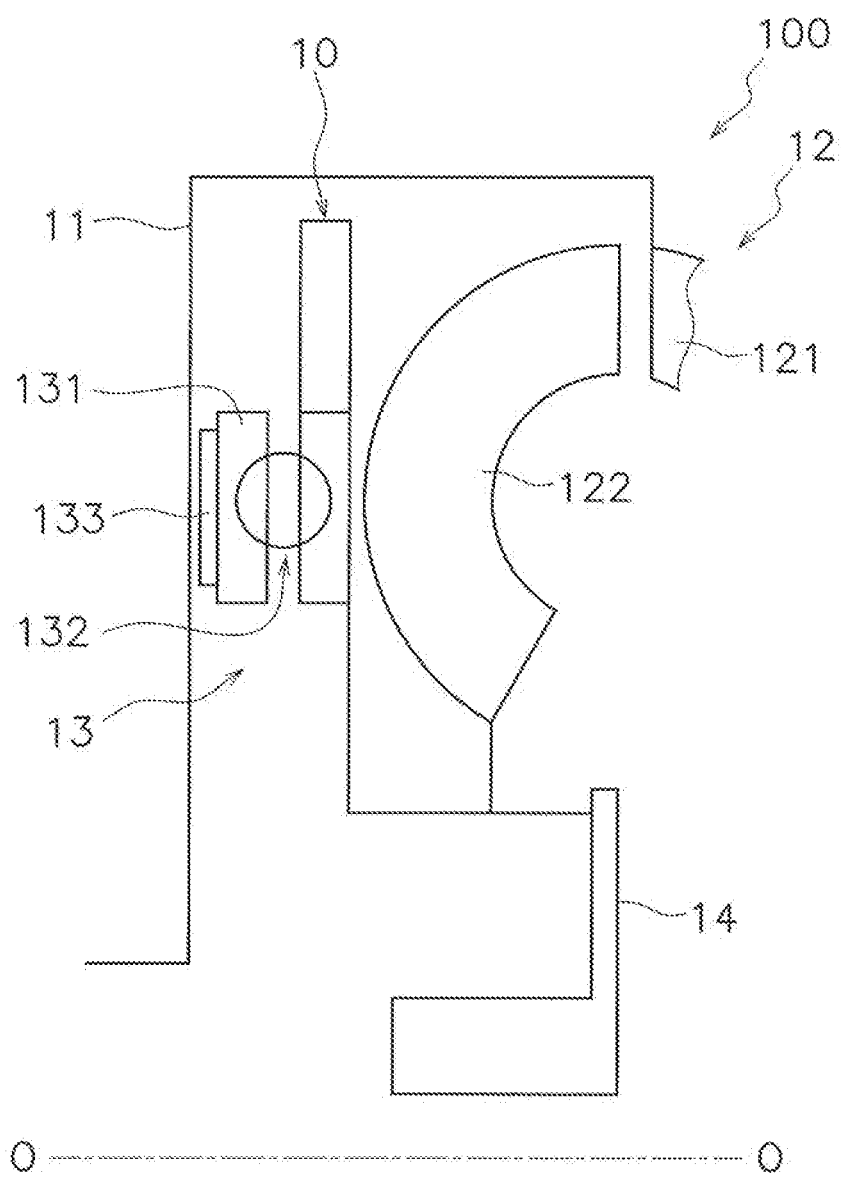
FIG. 1 is a schematic diagram of a torque converter.

A torque fluctuation inhibiting device and a power transmission device according to a preferred embodiment of the present invention will be explained with reference to drawings. FIG. 1 is a schematic diagram of a torque converter (exemplary power transmission device) according to the preferred embodiment. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a centrifugal element in FIG. 5. Likewise, the radial direction is not required to be perfectly matched with a diameter direction of the imaginary circle about the rotational axis O, and is conceptualized as encompassing, for instance, an up-and-down direction defined based on the centrifugal element in FIG. 5.

[Entire Configuration]

As shown in FIG. 1, a torque converter 100 includes a front cover 11, a torque converter body 12, a lock-up device 13 and an output hub 14 (exemplary output member). The front cover 11 is a member to which a torque is inputted from an engine. The torque converter body 12 includes an impeller 121 coupled to the front cover 11, a turbine 122 and a stator (not shown in the drawings). The turbine 122 is coupled to the output hub 14. An input shaft of a transmission (not shown in the drawings) is spline-coupled to the output hub 14.

[Lock-Up Device 13]

The lock-up device 13 includes a clutch part, a piston to be actuated by hydraulic pressure, and so forth, and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131 (exemplary input member), a damper 132 and a torque fluctuation inhibiting device 10.

The input-side rotor 131 includes the piston axially movable and is provided with a friction member 133 fixed to the front cover 11-side lateral surface thereof. When the friction member 133 is pressed onto the front cover 11, the torque is transmitted from the front cover 11 to the input-side rotor 131.

The damper 132 is disposed between the input-side rotor 131 and a hub flange 2 (to be described). The damper 132 includes a plurality of torsion springs, and elastically couples the input-side rotor 131 and the hub flange 2 in the circumferential direction. The damper 132 transmits the torque from the input-side rotor 131 to the hub flange 2, and besides, absorbs and attenuates torque fluctuations.

[Torque Fluctuation Inhibiting Device 10]

Figure 2:
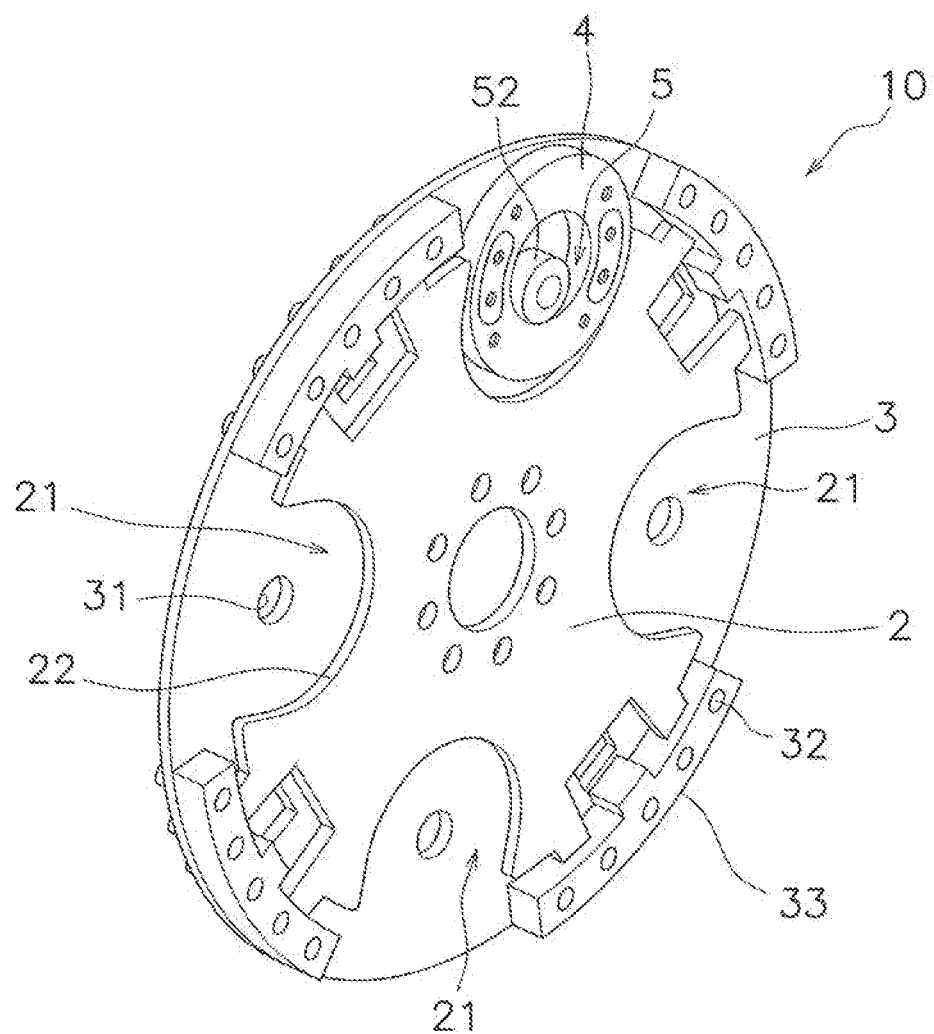
FIG. 2 is a perspective view of a torque fluctuation inhibiting device.
Figure 3:
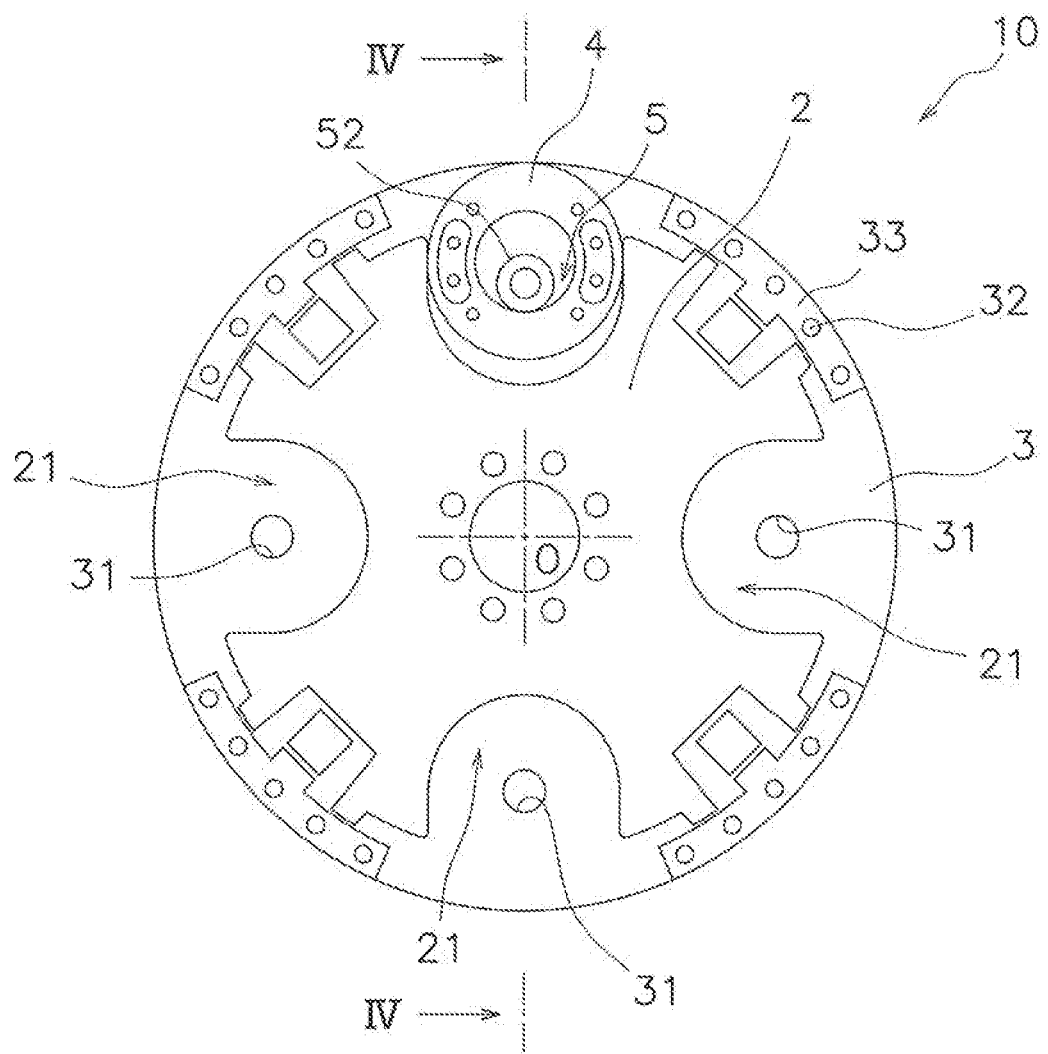
FIG. 3 is a front view of the torque fluctuation inhibiting device.
Figure 4:
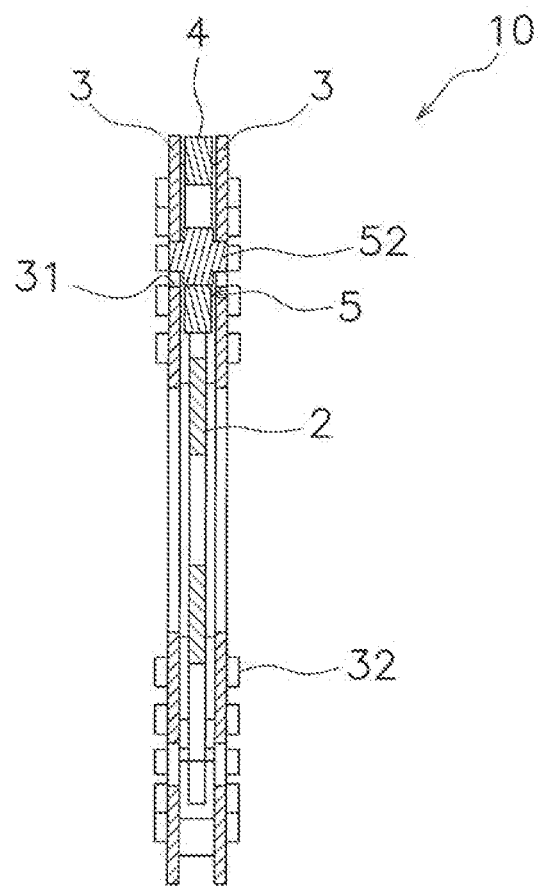
FIG. 4 is a cross-sectional view of FIG. 3 taken along line IV-IV.

FIG. 2 is a perspective view of the torque fluctuation inhibiting device 10. FIG. 3 is a front view of the torque fluctuation inhibiting device 10. FIG. 4 is a cross-sectional view of FIG. 3 taken along line IV-IV. It should be noted that in FIGS. 2 and 3, one of inertia rings 3 (near-side inertia ring 3) is detached. FIGS. 2 and 3 show only one of four centrifugal elements 4 without showing the remaining three. Likewise, FIGS. 2 and 3 show only one of four cam followers 52 without showing the remaining three.

As shown in FIGS. 2 to 4, the torque fluctuation inhibiting device 10 includes the hub flange 2 (exemplary first rotor), the pair of inertia rings 3 (exemplary second rotor), the centrifugal elements 4 and cam mechanisms 5.

<Hub Flange 2>

The hub flange 2 is disposed to be rotatable. The hub flange 2 is disposed in axial opposition to the input-side rotor 131. The hub flange 2 is rotatable relative to the input-side rotor 131. The hub flange 2 is coupled to the output hub 14. In other words, the hub flange 2 is unitarily rotated with the output hub 14. It should be noted that the hub flange 2 can be integrated with the output hub 14 as a single member.

The hub flange 2 has an annular shape. The hub flange 2 is coupled at the inner peripheral part thereof to the output hub 14. The hub flange 2 is provided with a plurality of accommodation portions 21. In the present preferred embodiment, the hub flange 2 is provided with four accommodation portions 21. The plural accommodation portions 21 are disposed away from each other at intervals in the circumferential direction. The accommodation portions 21 are provided in the outer peripheral part of the hub flange 2. Each accommodation portion 21 is opened radially outward. Each accommodation portion 21 has a predetermined depth.

Figure 5:
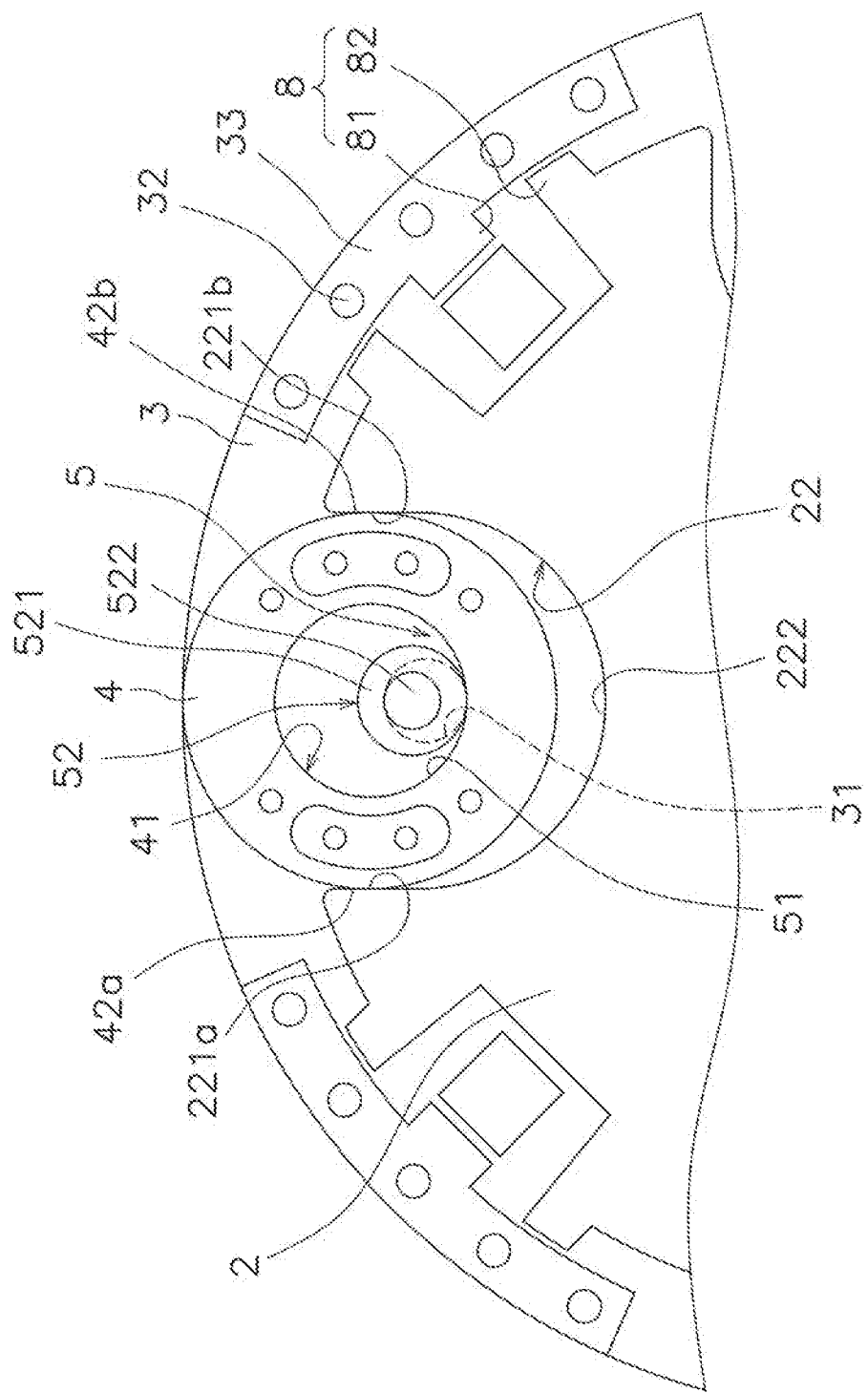
FIG. 5 is an enlarged view of the torque fluctuation inhibiting device.

FIG. 5 is an enlarged view of the torque fluctuation inhibiting device 10. As shown in FIG. 5, an inner wall surface 22, by which each accommodation portion 21 is delimited, includes a first guide surface 221a, a second guide surface 221b and a circular-arc surface 222.

The first and second guide surfaces 221a and 221b face in the circumferential direction (the right-and-left direction in FIG. 5). The first and second guide surfaces 221a and 221b face each centrifugal element 4. Without installation of each centrifugal element 4, the first and second guide surfaces 221a and 221b are opposed to each other. The first and second guide surfaces 221a and 221b extend approximately in parallel to each other. The first and second guide surfaces 221a and 221b are flat surfaces.

The circular-arc surface 222 connects the first guide surface 221a and the second guide surface 221b therethrough. In a front view (axial view), the circular-arc surface 222 has a circular-arc shape. The circular-arc surface 222 is shaped along the outer peripheral surface of each centrifugal element 4. Detailedly, the circular-arc surface 222 has a radius approximately equal to that of each centrifugal element 4. The circular-arc surface 222 faces radially outward. The circular-arc surface 222 is opposed to the outer peripheral surface of each centrifugal element 4.

<Inertia Rings 3>

As shown in FIGS. 2 to 4, each inertia ring 3 is an annular plate. Detailedly, each inertia ring 3 is made in the shape of a continuous annulus. The pair of inertia rings 3 functions as a mass body of the torque fluctuation inhibiting device 10. The pair of inertia rings 3 is disposed to interpose the hub flange 2 therebetween. The pair of inertia rings 3 is disposed axially on the both sides of the hub flange 2 such that a predetermined gap is produced between the hub flange 2 and each inertia ring 3. In other words, the hub flange 2 and the pair of inertia rings 3 are disposed in axial alignment. The pair of inertia rings 3 has a rotational axis common to the hub flange 2. The pair of inertia rings 3 is rotatable with the hub flange 2 and is also rotatable relative to the hub flange 2.

Each inertia ring 3 includes a plurality of second through holes 31. The second through holes 31 penetrate each inertia ring 3 in the axial direction. Each second through hole 31 has a diameter greater than that of each of a pair of small diameter portions 522 of each cam follower 52 (to be described). Besides, the diameter of each second through hole 31 is less than that of a large diameter portion 521 of each cam follower 52.

The pair of inertia rings 3 is fixed to each other by a plurality of rivets 32. Therefore, the pair of inertia rings 3 is axially, radially and circumferentially immovable relative to each other. In other words, the pair of inertia rings 3 is unitarily rotated with each other.

A plurality of inertia blocks 33 are disposed between the pair of inertia rings 3. The plural inertia blocks 33 are disposed away from each other at intervals in the circumferential direction. For example, the inertia blocks 33 and the centrifugal elements 4 are alternately disposed in the circumferential direction. The inertia blocks 33 are fixed to the pair of inertia rings 3. Specifically, the inertia blocks 33 are fixed to the pair of inertia rings 3 by the rivets 32. It should be noted that each inertia block 33 has a thickness greater than that of each centrifugal element 4.

<Centrifugal Elements 4>

Each centrifugal element 4 is disposed inside each accommodation portion 21. Each centrifugal element 4 is configured to receive a centrifugal force generated by rotation of the hub flange 2. Each centrifugal element 4 is radially movable inside each accommodation portion 21. Each centrifugal element 4 is restricted from axially moving by the pair of inertia rings 3.

As shown in FIG. 5, each centrifugal element 4 has a disc shape. Each centrifugal element 4 has a thickness greater than that of the hub flange 2. Each centrifugal element 4 can be provided as a single member. Each centrifugal element 4 is configured to roll on the inner wall surface 22 of each accommodation portion 21. Detailedly, each centrifugal element 4 rolls on the inner wall surface 22 of each accommodation portion 21 in radial movement. It should be noted that each centrifugal element 4 rolls on the first or second guide surface 221a, 221b of the inner wall surface 22.

For example, when the pair of inertia rings 3 is rotated relative to the hub flange 2 in the clockwise direction, each centrifugal element 4 rolls on the second guide surface 221b. Contrarily, when the pair of inertia rings 3 is rotated relative to the hub flange 2 in the counterclockwise direction, each centrifugal element 4 rolls on the first guide surface 221a.

When each centrifugal element 4 rolls, one region of the outer peripheral surface of each centrifugal element 4 rolls in contact with the first guide surface 221a. This region is defined as a first contact surface 42a. Also, when each centrifugal element 4 rolls, another region of the outer peripheral surface of each centrifugal element 4 rolls in contact with the second guide surface 221b. This region is defined as a second contact surface 42b. Each of the first and second contact surfaces 42a and 42b has a circular-arc shape in the axial view.

Preferably, the distance between the first and second guide surfaces 221a and 221b is slightly greater than or equal to the diameter of each centrifugal element 4. Now it is assumed that the distance between the first and second guide surfaces 221a and 221b is slightly greater than the diameter of each centrifugal element 4. In this case, when the first contact surface 42a rolls on the first guide surface 221a, the second contact surface 42b does not slide in contact with the second guide surface 221b. Contrarily, when the second contact surface 42b rolls on the second guide surface 221b, the first contact surface 42a does not slide in contact with the first guide surface 221a.

Each centrifugal element 4 includes a first through hole 41 in the middle part thereof. The first through hole 41 penetrates each centrifugal element 4 in the axial direction. The first through hole 41 has a diameter greater than that of each cam follower 52. Detailedly, the first through hole 41 has a diameter greater than that of the large diameter portion 521 of each cam follower 52. The inner wall surface of each centrifugal element 4, by which the first through hole 41 is delimited, is provided in part as a cam surface 51.

<Cam Mechanisms 5>

Each cam mechanism 5 is configured to receive a centrifugal force acting on each centrifugal element 4 and convert the centrifugal force into a circumferential force directed to reduce rotational phase difference between the hub flange 2 and the pair of inertia rings 3. It should be noted that each cam mechanism 5 functions when the rotational phase difference is produced between the hub flange 2 and the pair of inertia rings 3.

Each cam mechanism 5 includes the cam surface 51 and the cam follower 52. The cam surface 51 is provided on each centrifugal element 4. Detailedly, the cam surface 51 is part of the inner wall surface of the first through hole 41 of each centrifugal element 4. The cam surface 51 is a surface with which the cam follower 52 makes contact. The cam surface 51 has a circular-arc shape in the axial view. The cam surface 51 faces radially outward.

The cam follower 52 makes contact with the cam surface 51. The cam follower 52 is configured to transmit a force therethrough between each centrifugal element 4 and the pair of inertia rings 3. Detailedly, the cam follower 52 extends inside both the first through hole 41 and each pair of second through holes 31 of the pair of inertia rings 3. The cam follower 52 is attached to the pair of inertia rings 3, while being rotatable about a rotational axis thereof.

The cam follower 52 rolls on the cam surface 51 of the first through hole 41. Besides, the cam follower 52 rolls on the inner wall surfaces of each pair of second through holes 31 of the pair of inertia rings 3. It should be noted that the cam follower 52 makes contact with regions (i.e., regions facing radially inward) of the inner wall surfaces of each pair of second through holes 31 of the pair of inertia rings 3. In other words, the cam follower 52 is interposed between the cam surface 51 and the inner wall surfaces of each pair of second through holes 31 of the pair of inertia rings 3. Detailedly, the cam follower 52 makes contact with the cam surface 51 on the radially inner side, while making contact with the inner wall surfaces of each pair of second through holes 31 of the pair of inertia rings 3 on the radially outer side. This results in positioning of the cam follower 52. Moreover, the cam follower 52 transmits a force therethrough between each centrifugal element 4 and the pair of inertia rings 3 due to the configuration that the cam follower 52 is interposed between the cam surface 51 and the inner wall surfaces of each pair of second through holes 31 of the pair of inertia rings 3.

The cam follower 52 is provided as a roller made in the shape of a column (solid cylinder). In other words, the cam follower 52 is not a bearing. The cam follower 52 includes the large diameter portion 521 and the pair of small diameter portions 522. The center of the large diameter portion 521 and that of each small diameter portion 522 are matched with each other. The large diameter portion 521 has a diameter greater than that of each small diameter portion 522. The diameter of the large diameter portion 521 is less than that of the first through hole 41 but is greater than that of each second through hole 31. The large diameter portion 521 rolls on the cam surface 51.

The pair of small diameter portions 522 axially protrudes to the both sides from the large diameter portion 521. The pair of small diameter portions 522 roll on the inner wall surfaces of each pair of second through holes 31 of the pair of inertia rings 3. Each small diameter portion 522 has a diameter less than that of each second through hole 31. The cam follower 52 can be provided as a single member. In other words, the large diameter portion 521 and the pair of small diameter portions 522 in the cam follower 52 are provided as a single member. It should be noted that the cam follower 52 can be made in the shape of a column (solid cylinder) with a constant diameter. Alternatively, the cam follower 52 can be made in the shape of a cylinder (hollow cylinder).

When rotational phase difference is produced between the hub flange 2 and the pair of inertia rings 3 by the contact between the cam follower 52 and the cam surface 51 and the contact between the cam follower 52 and the inner wall surfaces of each pair of second through holes 31 of the pair of inertia rings 3, the centrifugal force generated in each centrifugal element 4 is converted into the circumferential force by which the rotational phase difference is reduced.

<Stopper Mechanisms 8>

The torque fluctuation inhibiting device 10 further includes stopper mechanisms 8. The stopper mechanisms 8 restrict an angular range of relative rotation between the hub flange 2 and the pair of inertia rings 3. Each stopper mechanism 8 includes a first protrusion 81 and second protrusions 82.

The first protrusion 81 protrudes radially inward from each inertia block 33. The second protrusions 82 protrude radially outward from the hub flange 2. The angular range of relative rotation between the hub flange 2 and the pair of inertia rings 3 is restricted by the contact between the first protrusion 81 and each second protrusion 82 in each stopper mechanism 8.

[Actuation of Torque Fluctuation Inhibiting Device 10]

Actuation of the torque fluctuation inhibiting device 10 will be explained with FIGS. 6 and 7.

In the lock-up on state, a torque transmitted to the front cover 11 is transmitted to the hub flange 2 through the input-side rotor 131 and the damper 132.

Figure 6:
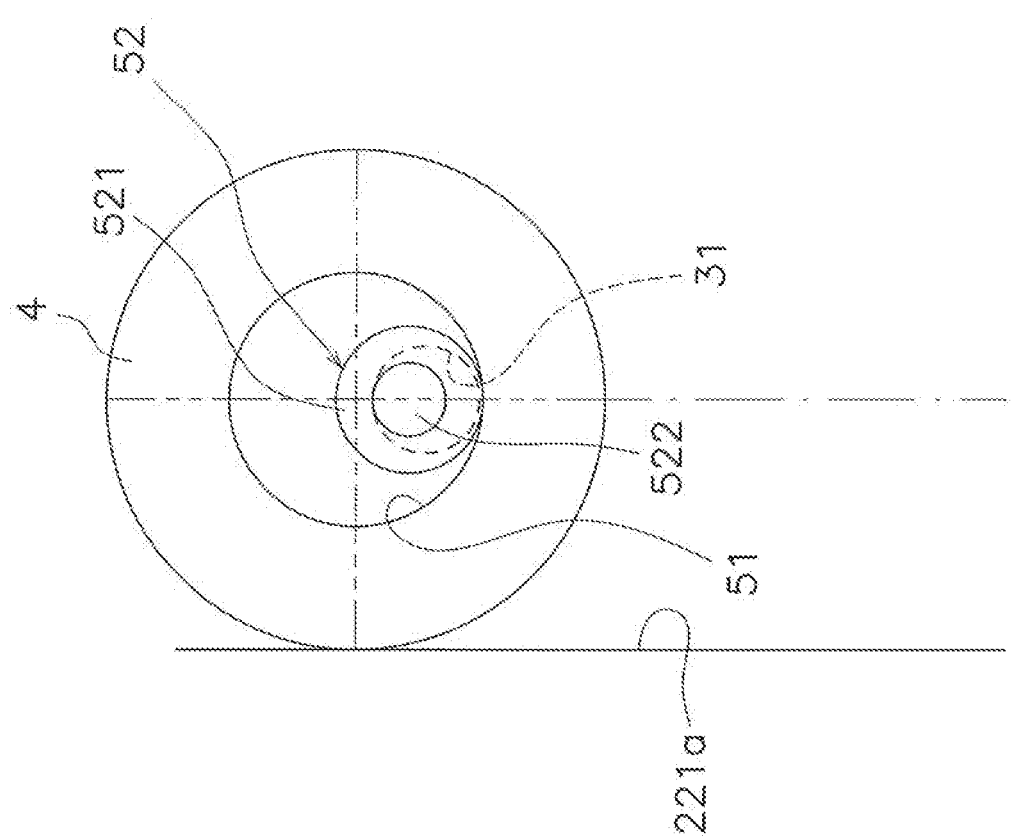
FIG. 6 is a diagram roughly showing a positional relation among a centrifugal element, a cam follower and an inertia ring in a condition without input of torque fluctuations.

When torque fluctuations do not exist in torque transmission, the hub flange 2 and the pair of inertia rings 3 are rotated in a condition shown in FIG. 6. In this condition, the cam follower 52 in each cam mechanism 5 makes contact with the radial innermost position (circumferential middle position) of the cam surface 51. Besides, in this condition, the rotational phase difference between the hub flange 2 and the pair of inertia rings 3 is "0".

As described above, the circumferential relative displacement between the hub flange 2 and the pair of inertia rings 3 is referred to as "rotational phase difference". In FIGS. 6 and 7, these terms indicate displacement between the circumferential middle position of both each centrifugal element 4 and the cam surface 51 and the center position of each second through hole 31.

Figure 7:
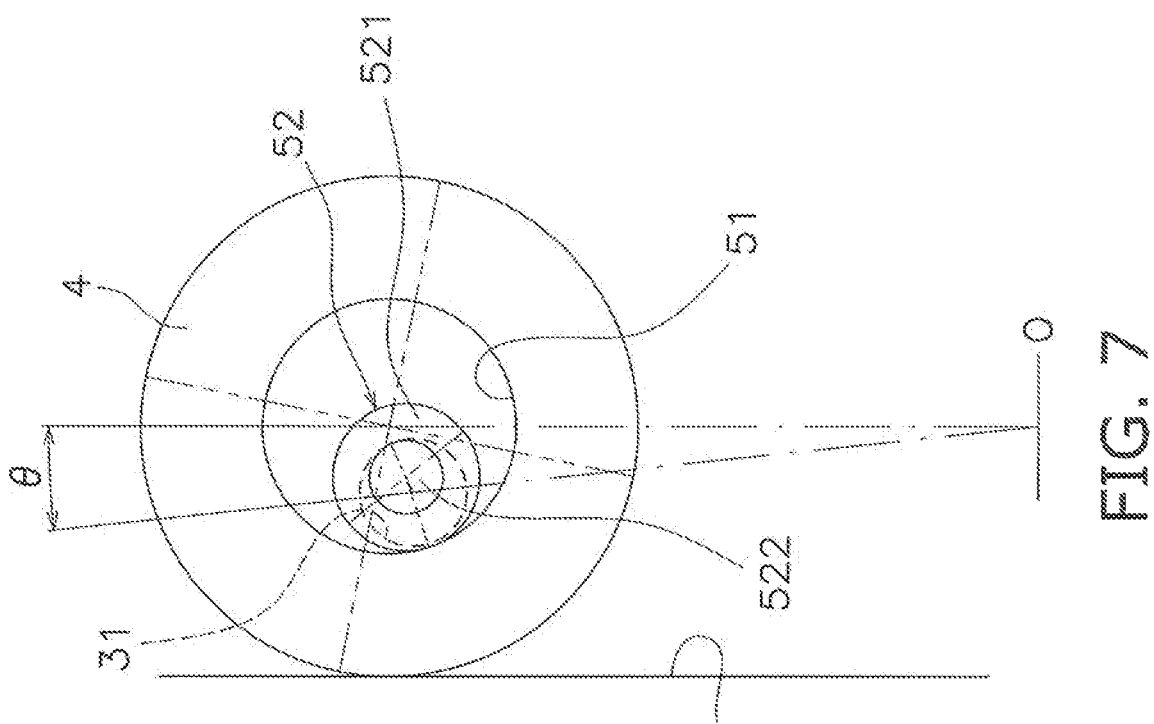
FIG. 7 is a diagram roughly showing a positional relation among the centrifugal element, the cam follower and the inertia ring in a condition with input of torque fluctuations.

When torque fluctuations herein exist in torque transmission, rotational phase difference θ is produced between the hub flange 2 and the pair of inertia ring 3 as shown in FIG. 7.

As shown in FIG. 7, when the rotational phase difference θ is produced between the hub flange 2 and the pair of inertia rings 3, the cam follower 52 in each cam mechanism 5 is moved from a position shown in FIG. 6 to a position shown in FIG. 7. At this time, the cam follower 52 is relatively moved to the left side while rolling on the cam surface 51. Besides, the cam follower 52 also rolls on the inner wall surfaces of each pair of second through holes 31 of the pair of inertia rings 3. Detailedly, the large diameter portion 521 of the cam follower 52 rolls on the cam surface 51, whereas the pair of small diameter portions 522 of the cam follower 52 rolls on the inner wall surfaces of each pair of second through holes 31 of the pair of inertia rings 3. It should be noted that the cam follower 52 is rotated counterclockwise about the rotational axis thereof.

When moved leftward, the cam follower 52 presses each centrifugal element 4 radially inward (downward in FIGS. 6 and 7) through the cam surface 51, whereby each centrifugal element 4 is moved radially inward. As a result, each centrifugal element 4 is moved from a position shown in FIG. 6 to a position shown in FIG. 7. At this time, each centrifugal element 4 is moved radially inward while rolling on the inner wall surface 22 of each accommodation portion 21. Detailedly, each centrifugal element 4 rolls on the first guide surface 221a of the inner wall surface 22. Each centrifugal element 4 is rotated clockwise about a rotational axis thereof.

A centrifugal force is acting on each centrifugal element 4 moved to the position shown in FIG. 7 as described above. Hence, each centrifugal element 4 is moved radially outward (upward in FIG. 7). Detailedly, each centrifugal element 4 is moved radially outward while rolling on the first guide surface 221a. It should be noted that each centrifugal element 4 is rotated counterclockwise about the rotational axis thereof.

Then, the cam surface 51 provided on each centrifugal element 4 presses the pair of inertia rings 3 through the cam follower 52 to the right side in FIG. 7, whereby the pair of inertia rings 3 is moved to the right side in FIG. 7. At this time, the large diameter portion 521 of the cam follower 52 rolls on the cam surface 51, whereas the pair of small diameter portions 522 of the cam follower 52 rolls on the inner wall surfaces of each pair of second through holes 31 of the pair of inertia rings 3. It should be noted that the cam follower 52 is rotated clockwise about the rotational axis thereof. As a result, the condition shown in FIG. 6 is restored.

It should be noted that when the rotational phase difference is reversely produced, the cam follower 52 is relatively moved along the cam surface 51 to the right side in FIG. 7. However, the actuation principle described above is also true of this case. At this time, each centrifugal element 4 rolls on the second guide surface 221b.

As described above, when the rotational phase difference is produced between the hub flange 2 and the pair of inertia rings 3 by torque fluctuations, the hub flange 2 receives the circumferential force directed to reduce the rotational phase difference between the both by the centrifugal force acting on each centrifugal element 4 and the working of each cam mechanism 5. Torque fluctuations are inhibited by this force. It should be noted that a force is transmitted between each centrifugal element 4 and the pair of inertia rings 3 through each cam follower 52.

The aforementioned force inhibiting torque fluctuations varies in accordance with the centrifugal force, in other words, the rotational speed of the hub flange 2, and also varies in accordance with the rotational phase difference and the shape of the cam surface 51. Therefore, by suitably setting the shape of the cam surface 51, characteristics of the torque fluctuation inhibiting device 10 can be made optimal in accordance with the specification of the engine and so forth.

Besides, each centrifugal element 4 is radially moved while rolling on the first or second guide surface 221a, 221b. Because of this, each centrifugal element 4 is radially movable in a smoother manner than that sliding on the first or second guide surface 221a, 221b. Moreover, each cam follower 52 rolls on the inner wall surface of the cam surface 51 and the inner wall surfaces of each pair of second through holes 31 of the pair of inertia rings 3. Because of this, a force can be transmitted between each centrifugal element 4 and the pair of inertia rings 3 in as smooth a manner as possible.

[Exemplary Characteristics]

Figure 8:
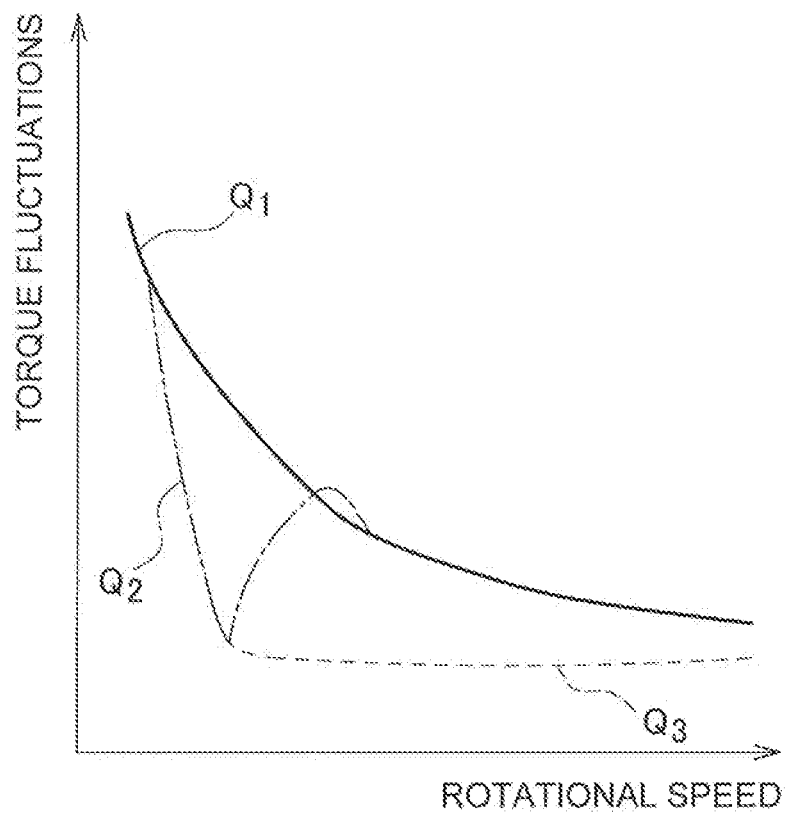
FIG. 8 is a chart showing exemplary characteristics of the torque fluctuation inhibiting device.

FIG. 8 is a diagram showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present preferred embodiment.

As is obvious from FIG. 8, in an apparatus in which the well-known dynamic damper device without any cam mechanism is installed (characteristic Q2), torque fluctuations can be inhibited only in a specific rotational speed range. By contrast, in the condition with installation of the torque fluctuation inhibiting device 10 with the cam mechanisms 5 of the present preferred embodiment (characteristic Q3), torque fluctuations can be inhibited through the entire rotational speed ranges.

[Modifications]

The present invention is not limited to the preferred embodiment described above, and a variety of changes or modifications can be made without departing from the scope of the present invention.

<Modification 1>

Figure 9:
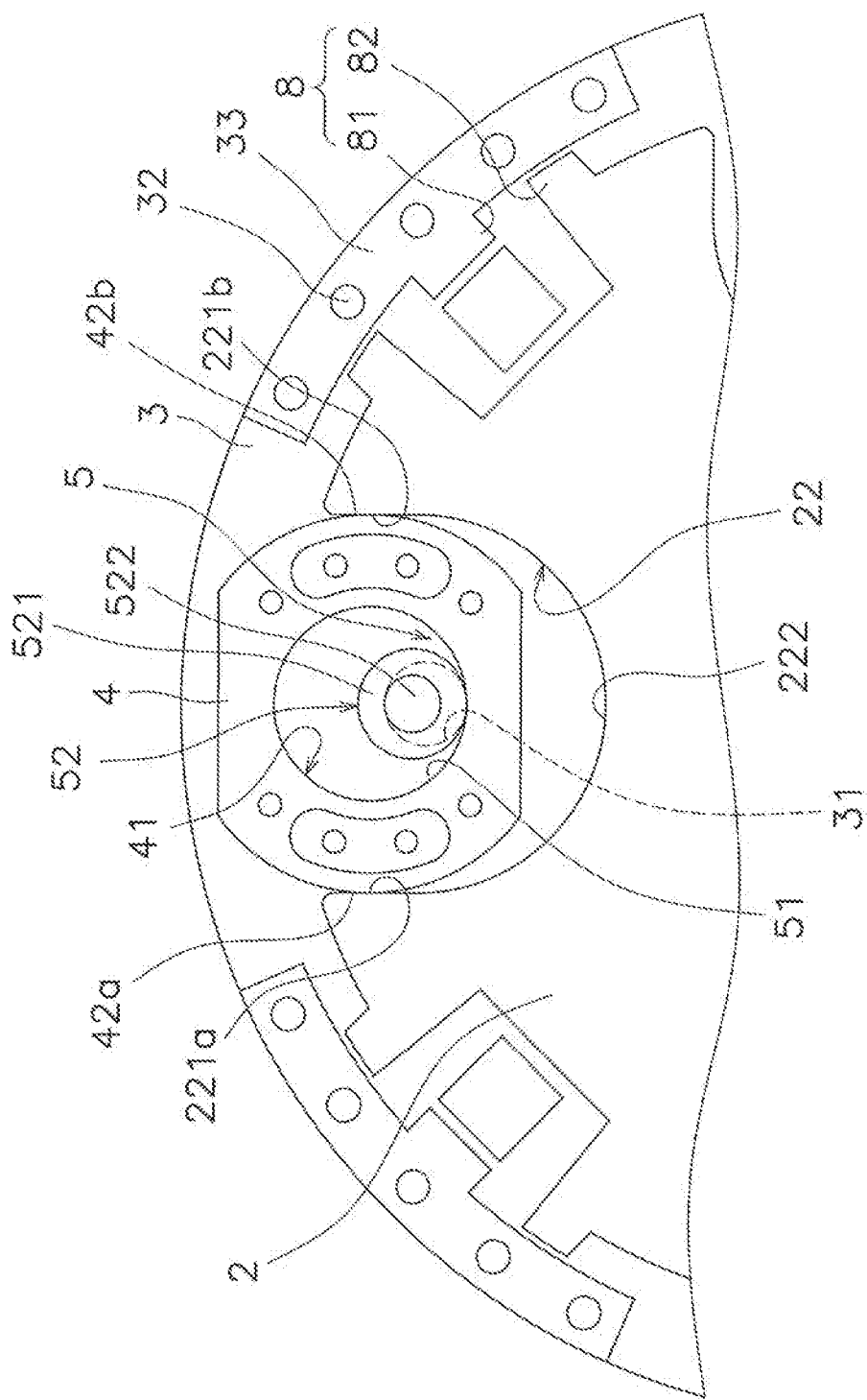
FIG. 9 is an enlarged view of a torque fluctuation inhibiting device according to another modification.

Each centrifugal element 4 may not have a disc shape. For example, as shown in FIG. 9, each centrifugal element 4, except for the first and second contact surfaces 42a and 42b, may not have a circular-arc shape in a front view.

<Modification 2>

Each cam follower 52 can be attached to each pair of second through holes 31 of the pair of inertia rings 3 through a pair of bearing members.

<Modification 3>

In the aforementioned preferred embodiment, the hub flange 2 is provided with the centrifugal elements 4. Alternatively, the pair of inertia rings 3 can be provided with the centrifugal elements 4. In this case, the pair of inertia rings 3 corresponds to the first rotor of the present invention, whereas the hub flange 2 corresponds to the second rotor of the present invention.

<Modification 4>

In the aforementioned preferred embodiment, the hub flange 2 has been exemplified as the first rotor. However, the first rotor is not limited to the above. For example, when a torque fluctuation inhibiting device is attached to a torque converter as configured in the present preferred embodiment, the front cover 11, the input-side rotor 131 or so forth can be set as the first rotor in the torque converter 100.

<Modification 5>

In the aforementioned preferred embodiment, the torque fluctuation inhibiting device 10 is attached to the torque converter 100. Alternatively, the torque fluctuation inhibiting device 10 can be attached to another type of power transmission device such as a clutch device.

Figure 10:
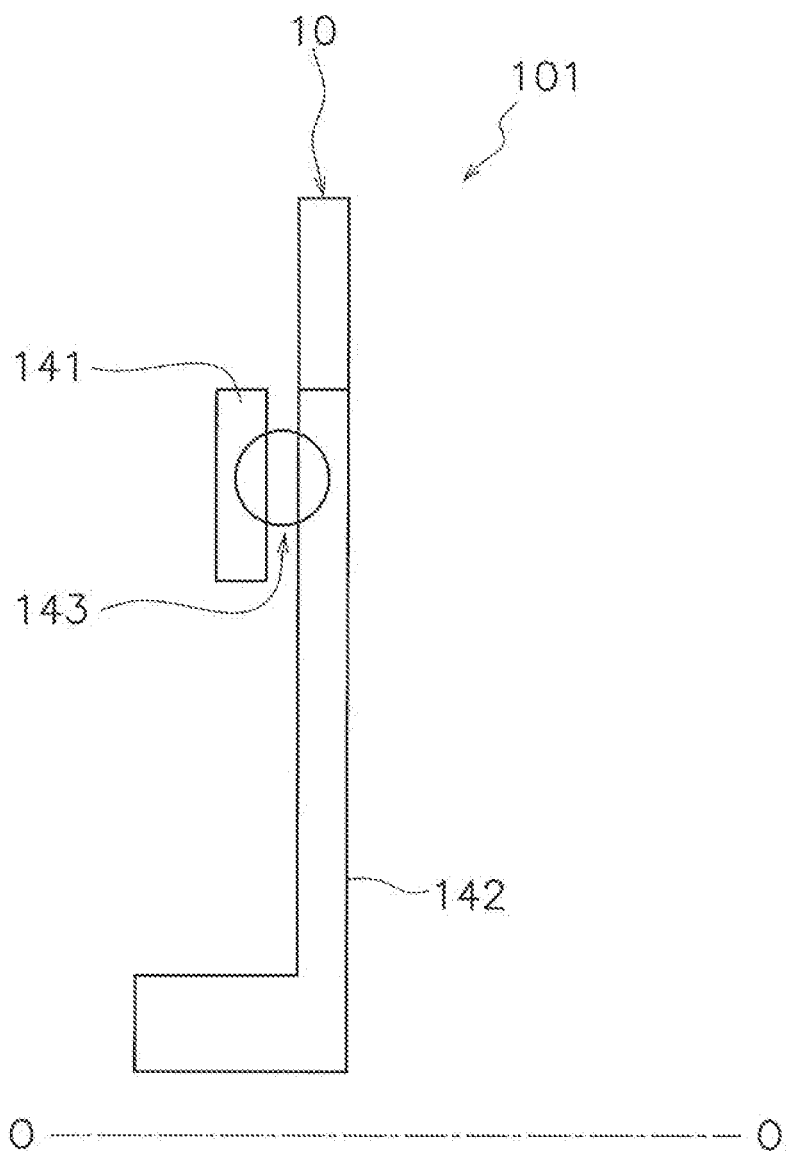
FIG. 10 is a schematic diagram of a damper device.

For example, as shown in FIG. 10, the torque fluctuation inhibiting device 10 can be attached to a damper device 101. The damper device 101 is installed in, for instance, a hybrid vehicle. The damper device 101 includes an input member 141, an output member 142, a damper 143 and the torque fluctuation inhibiting device 10. The input member 141 is a member to which a torque is inputted from a drive source. The damper 143 is disposed between the input member 141 and the output member 142. The output member 142 is a member to which the torque is transmitted from the input member 141 through the damper 143. The torque fluctuation inhibiting device 10 is attached to, for instance, the output member 142.

REFERENCE SIGNS LIST

2 Hub flange
21 Accommodation portion
3 Inertia ring
31 Second through hole
4 Centrifugal element
41 First through hole
5 Cam mechanism
51 Cam surface
52 Cam follower

What is claimed is:

1. A torque fluctuation inhibiting device comprising:
a first rotor including an accommodation portion, the first rotor disposed to be rotatable;
a second rotor disposed to be rotatable with the first rotor and be rotatable relative to the first rotor;
a centrifugal element disposed in the accommodation portion so as to be radially movable, the centrifugal element configured to receive a centrifugal force generated by rotation of the first rotor or the second rotor; and
a cam mechanism configured to receive the centrifugal force acting on the centrifugal element, the cam mechanism further configured to convert the centrifugal force into a circumferential force directed to reduce rotational phase difference between the first rotor and the second rotor, wherein
the cam mechanism includes
a cam surface provided on the centrifugal element, and
a cam follower configured to make contact with the cam surface, the cam follower further configured to transmit a force therethrough between the centrifugal element and the second rotor, and
the centrifugal element is further configured to be radially moved while an outer surface of the centrifugal element contacts an inner wall surface of the accommodation portion and rolls on the inner wall surface of the accommodation portion.

2. The torque fluctuation inhibiting device according to claim 1, wherein the cam follower is further configured to roll on the cam surface.

3. The torque fluctuation inhibiting device according to claim 1, wherein
the centrifugal element includes a first through hole axially penetrating therethrough, and
the cam surface is provided as part of an inner wall surface of the first through hole.

4. The torque fluctuation inhibiting device according to claim 3, wherein
the second rotor includes a second through hole, and
the cam follower is further configured to roll on an inner wall surface of the second through hole.

5. The torque fluctuation inhibiting device according to claim 1, wherein the cam follower is attached to the second rotor in a state of being rotatable about a rotational axis thereof.

6. The torque fluctuation inhibiting device according to claim 1, wherein the cam follower is a roller having a shape of a solid or hollow cylinder.

7. A power transmission device comprising:
an input member;
an output member to which a torque is transmitted from the input member; and
the torque fluctuation inhibiting device recited in claim 1.

8. A torque fluctuation inhibiting device comprising:
a first rotor including an accommodation portion, the first rotor disposed to be rotatable;
a second rotor disposed to be rotatable with the first rotor and be rotatable relative to the first rotor;
a centrifugal element disposed in the accommodation portion so as to be radially movable, the centrifugal element configured to receive a centrifugal force generated by rotation of the first rotor or the second rotor, the centrifugal element including a through hole axially penetrating therethrough; and a cam mechanism configured to receive the centrifugal force acting on the centrifugal element, the cam mechanism further configured to convert the centrifugal force into a circumferential force directed to reduce rotational phase difference between the first rotor and the second rotor, wherein the cam mechanism includes
- a cam surface provided on the centrifugal element and provided as part of an inner wall surface of the through hole, and
- a cam follower configured to make contact with the cam surface, the cam follower further configured to transmit a force therethrough between the centrifugal element and the second rotor, and the centrifugal element is further configured to be radially moved while rolling on an inner wall surface of the accommodation portion.

9. A torque fluctuation inhibiting device comprising:
a first rotor including an accommodation portion, the first rotor disposed to be rotatable;
a second rotor disposed to be rotatable with the first rotor and be rotatable relative to the first rotor;
a centrifugal element disposed in the accommodation portion so as to be radially movable, the centrifugal element configured to receive a centrifugal force generated by rotation of the first rotor or the second rotor; and a cam mechanism configured to receive the centrifugal force acting on the centrifugal element, the cam mechanism further configured to convert the centrifugal force into a circumferential force directed to reduce rotational phase difference between the first rotor and the second rotor, wherein the cam mechanism includes
- a cam surface provided on the centrifugal element, and
- a cam follower configured to make contact with the cam surface, the cam follower further configured to transmit a force therethrough between the centrifugal element and the second rotor, the centrifugal element is further configured to be radially moved while rolling on an inner wall surface of the accommodation portion, the second rotor includes a through hole, and the cam follower is further configured to roll on an inner wall surface of the through hole.

* * * * *